W. H. COLDWELL.
GANG LAWN MOWER.
APPLICATION FILED MAY 3, 1917.

1,246,234.

Patented Nov. 13, 1917.
5 SHEETS—SHEET 3.

INVENTOR
William H. Coldwell
BY
Whitaker Prevost
ATTORNEY

W. H. COLDWELL.
GANG LAWN MOWER.
APPLICATION FILED MAY 3, 1917.

1,246,234.

Patented Nov. 13, 1917.
5 SHEETS—SHEET 4.

William H. Coldwell, INVENTOR

BY Whitaker Prevost, ATTORNEY

W. H. COLDWELL.
GANG LAWN MOWER.
APPLICATION FILED MAY 3, 1917.

1,246,234.

Patented Nov. 13, 1917.
5 SHEETS—SHEET 5.

INVENTOR
William H. Coldwell
BY
Whitaker Prevost ATTORNEYS

UNITED STATES PATENT OFFICE.

WILLIAM HERBERT COLDWELL, OF NEWBURGH, NEW YORK.

GANG LAWN-MOWER.

1,246,234.    Specification of Letters Patent.    Patented Nov. 13, 1917.

Application filed May 3, 1917. Serial No. 166,089.

*To all whom it may concern:*

Be it known that I, WILLIAM H. COLDWELL, a citizen of the United States, residing at Newburgh, in the county of Orange and State of New York, have invented certain new and useful Improvements in Gang Lawn-Mowers; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one embodiment of the invention selected by me for purposes of illustration, and the said invention is fully disclosed in the following description and claims.

My invention relates to gang lawn mowers of the kind in which a wide swath is cut by a plurality of mower units, each of which cuts a portion of the width of the entire swath cut by the machine. In these machines as heretofore constructed it has been customary to arrange a plurality of mower units in rows in echelon formation, the mower unit or mower units of one row preceding the unit or units of the other row, and being located in different positions transversely of the machine from the unit or units of the other row, all of the units being connected with and carrying a superposed frame which rests entirely upon the mower units.

In such a construction it necessarily follows that certain of the ground engaging traction or drive wheels of one or more units, to wit, those of the front or foremost row must necessarily pass over the long uncut grass in advance of the cutting mechanism of the following units of the rear row, and as these traction or drive wheels not only support a large part of the weight of their own mower units, but also a part of the weight of the superposed frame, and of whatever is carried on the frame, as the operator, etc., they press down the long uncut grass in such a manner as to interfere with the action of the cutting mechanism of the following unit or units thereon, so that after the plot of ground is cut, it is frequently left with streaks or strips of longer grass where the grass so pressed down by the advanced traction or drive wheels afterward straightens itself up and is longer than the surrounding portions of the lawn. It is also found that in such machines the traction or drive wheels not infrequently cut into or indent the sod in passing over the same especially in case of moist or soft ground, leaving objectionable and unsightly ridges, depending as to their depth upon the width of the wheels and the weight supported thereby. In such machines also it is customary to connect the mower units of the front and rear rows by some form of fifth wheel construction to facilitate turning the machine and in most cases it is extremely difficult to turn these machines quickly, and impossible to turn them at right angles, and in mowing on a side hill the mower units of one of the other of said ranks frequently tends to slide or shift down-hill thereby making it impossible to keep it or them in the proper relation to the unit or units of the other row, and to effect the uniform cutting throughout the width of the swath which should be cut by the machine.

One of the objects of my invention is to provide a multiple unit machine in which all of the ground engaging traction or driving wheels or rollers have their axes in a single vertical plane extending transversely of the machine so that the machine can be quickly and sharply turned in the same manner as an ordinary sulky or other two wheeled vehicle, while at the same time the possibility of a lateral shifting of the cutting mechanism of one unit with respect to those of other units is positively prevented.

Another object of my invention is to locate the cutting mechanism or mechanisms occupying a more advanced position, in advance of the traction or driving wheels or rollers, which actuate the cutting mechanism thereof, and in advance of and overlapping the cutting mechanism of another unit or units, so that there shall not be any traction or driving wheel or roller or any other ground engaging rotary device carrying a detrimental load located immediately forward of the cutting mechanism of any unit of the machine. This prevents the rolling down or depressing of the uncut grass in front of any one of the cutting mechanisms of the several mower units.

Another object of my invention is to provide a draft frame for the machine having a transversely disposed portion adjacent to the traction devices of the mower units, and a longitudinally disposed portion rigidly connected therewith and forming the draft mechanism by which the machine may be drawn or pushed by horse or tractor or otherwise, the weight of the said frame being so disposed that only a part of it is carried by certain of the traction wheels of the units, the remaining part of the weight being carried by the horse or tractor so that the said traction wheels are relieved of a considerable portion of the weight of said frame and its load. In other words the center of gravity of the frame and its load is located forward of the transverse vertical plane of the axis of the traction wheels or rollers. I also prefer to provide means for adjusting the driver's seat, and portions of the frame itself, as for example, the foot support or portions of the flooring, longitudinally with respect to the transverse portion of the frame so as to vary the proportion of the weight of the frame, and its load, carried by the said traction wheels or rollers, and by the horse, horses or tractor by which the machine is drawn or pushed, as may be found desirable from time to time. Thus if the machine is operating on soft ground said parts may be adjusted farther from the transverse plane of the axes of the traction wheels of the mower units to throw a greater proportion of the load on the horse or tractor, and if the machine is operating on hard ground on which the traction wheels may be inclined to slip, the said parts may be adjusted toward the vertical plane of the axes of said wheels to throw a greater proportion of the load thereon and increase their traction.

Referring to the accompanying drawings:

Fig. 6 is a detail view showing a form of clutch mechanism which may be conveniently used for throwing the rotary cutter of said mower unit into and out of operation.

Referring to the accompanying drawings which illustrate one embodiment of my invention selected by me for purposes of illustration, I have shown a lawn mowing machine comprising three mower units, each of which comprises ground engaging rotary traction devices and cutting mechanism actuated thereby, the two lateral units being preferably similar in construction and operation and serving to partially support a light frame connecting said units, and to which the third or centrally located unit is connected, the said centrally located unit having its rotary ground engaging traction device or devices so located that the axis thereof is in the same vertical transverse plane as the axes of the traction devices of the lateral units, and being connected to, but not supporting any part of the superposed frame, while the cutting mechanism for said centrally located unit which is so arranged that its swath will slightly overlap those of the cutting mechanisms of the lateral units, is carried in advance of the rotary ground engaging traction device or devices therefor.

Figure 1:
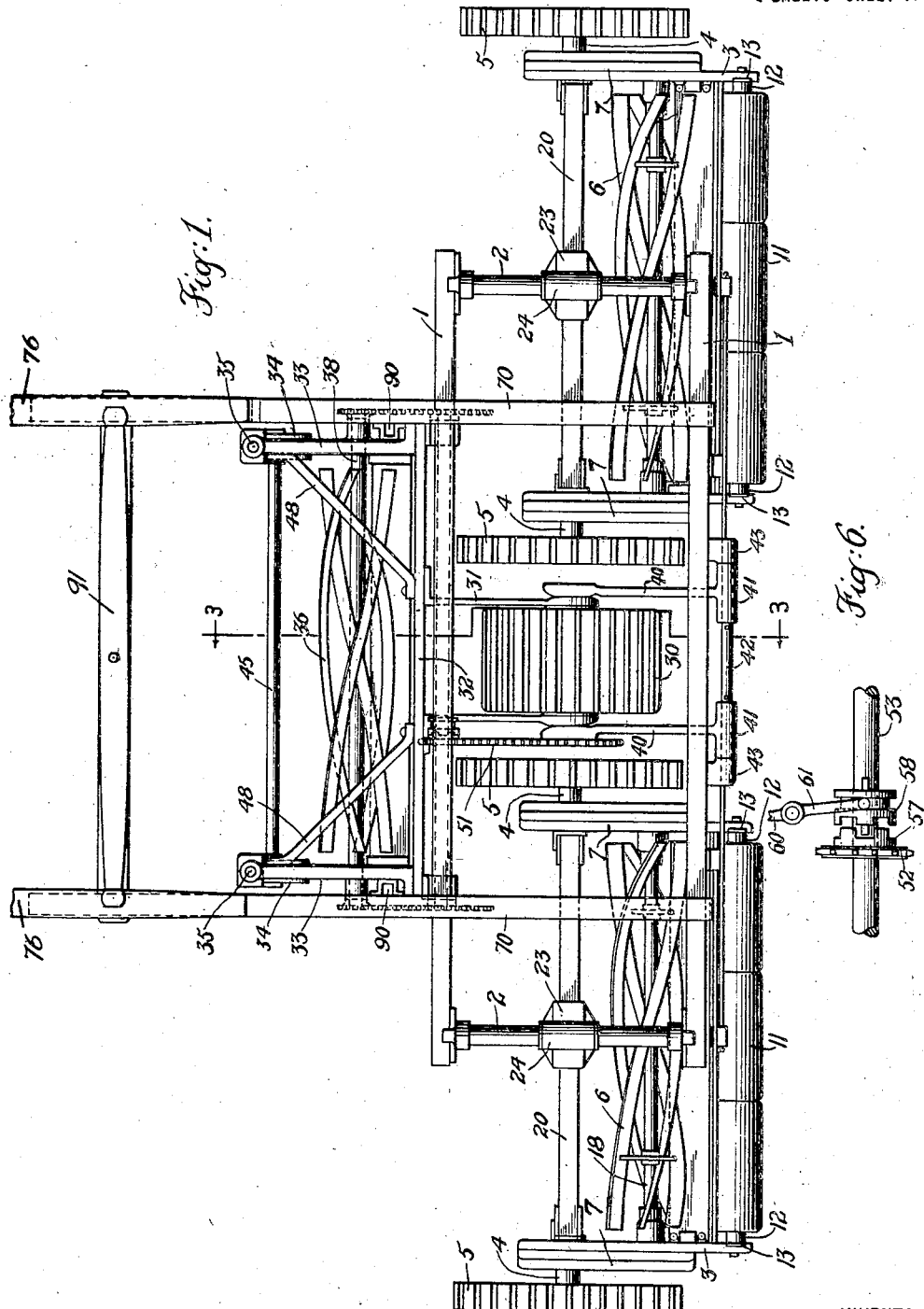
Figure 1 represents a top plan view of a lawn mower constructed in accordance with and being one embodiment of my invention.

In the embodiment of my invention herein shown the draft frame or main frame of the machine comprises a transverse portion formed by the bars, 1—1, connected adjacent to their outer ends by longitudinally disposed bars, 2—2, to which are pivotally connected the laterally disposed mower units. The draft frame is also provided with a longitudinally disposed portion rigidly connected to the transverse portions and constructed so that it may be attached to a draft animal or animals or tractor, and this longitudinally disposed portion of the frame may be constructed in many ways and may extend either forward or rearward of the transverse portion to which it is rigidly connected. In this instance, the said longitudinally extending portion of the draft frame comprises longitudinal bars, 70, rigidly secured to the cross bars, 1, and preferably provided with a flooring, 83, between them, which is omitted in Fig. 1 for greater clearness, and forwardly extending draft member or members, as shafts, 76, rigidly secured to the members, 70, and, in this instance, adjustable vertically with respect thereto in order to accommodate horses or tractors of different heights and to maintain the draft frame substantially in horizontal position.

The draft frame also includes a foot board, 95, for the driver's seat, which is, in this instance, supported between blocks, 96, adjustable with the foot board, longitudinally of the machine by means of slots, 70ª, in the parts, 70, and bolts, 97, passing through said blocks and slots, the foot board serving to stiffen the frame at the front, and being adjustable longitudinally as is also the driver's seat, as hereinafter described, to vary the amount of weight carried respectively by certain of the mower units and the draft animal or tractor.

These laterally disposed mower units are alike in structure, and a description of one will suffice for both. Each of these units comprises a pair of side frames indicated at 3—3 carrying revoluble stub axles, 4, to each of which is attached a ground engaging traction or drive wheel, 5, connected by gearing with the rotary cutter indicated at 6, and protected by an exterior gear casing, 7, the side frames being united by suitable tie rods indicated at 8—8, see Figs. 7 and 8, and by the stationary knife bar, 9, carrying the stationary knife, 10, and the rear ends of the side frames being carried by the usual rear roller, 11, mounted on a shaft, 12, supported in hangers, 13, adjustably secured to the frames for the purpose of regulating the height of cut. Each of the stub axles, 4, is suitably mounted in the adjacent side frame and casing, and is provided with a driving gear, 14, connected, as by intermediate gears, 15 and 16, for example, as shown in Fig. 8, with a driving pinion, 17, mounted upon one end of the shaft 18, of the rotary cutter, preferably by the well known over running clutch so that the rotary cutter will not be rotated when the wheel, 5, is turned rearwardly, while the rotary cutter will be driven by the forward movement of either of the wheels, 5.

Figure 2:
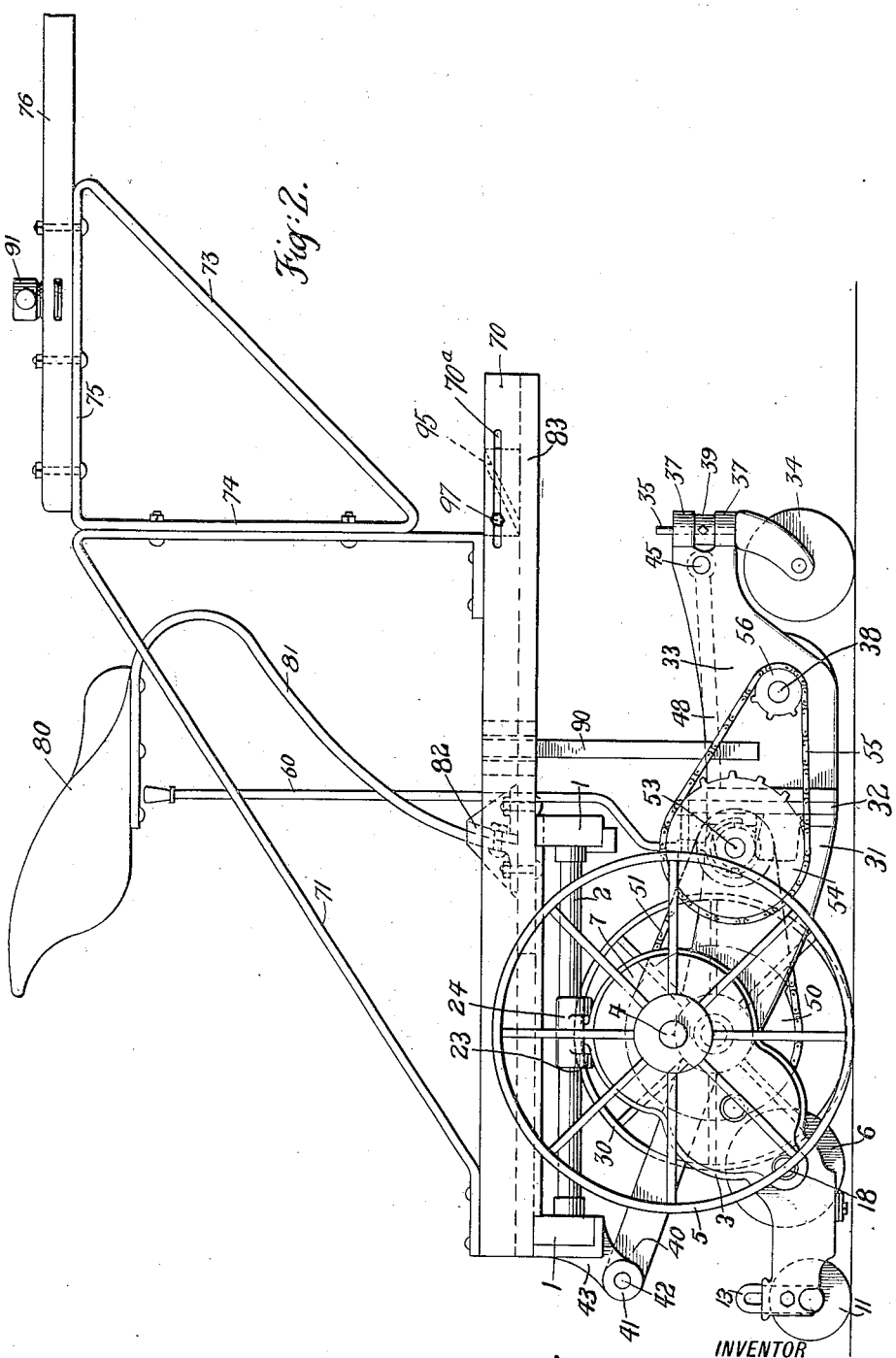
Fig. 2 represents a side elevation of the machine shown in Fig. 1.
Figure 3:
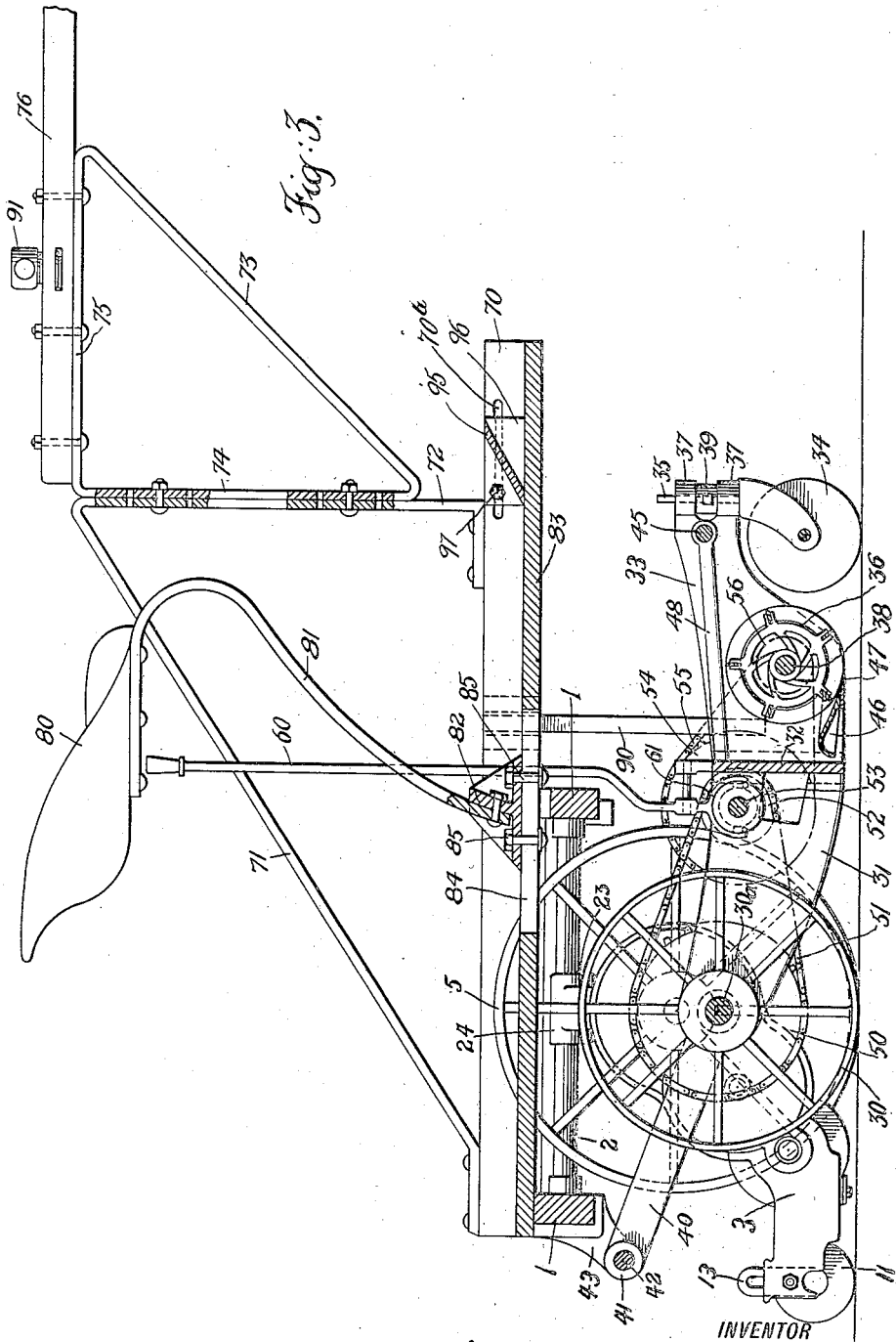
Fig. 3 represents a vertical central longitudinal section of Fig. 1 on the line 3—3.
Figure 4:
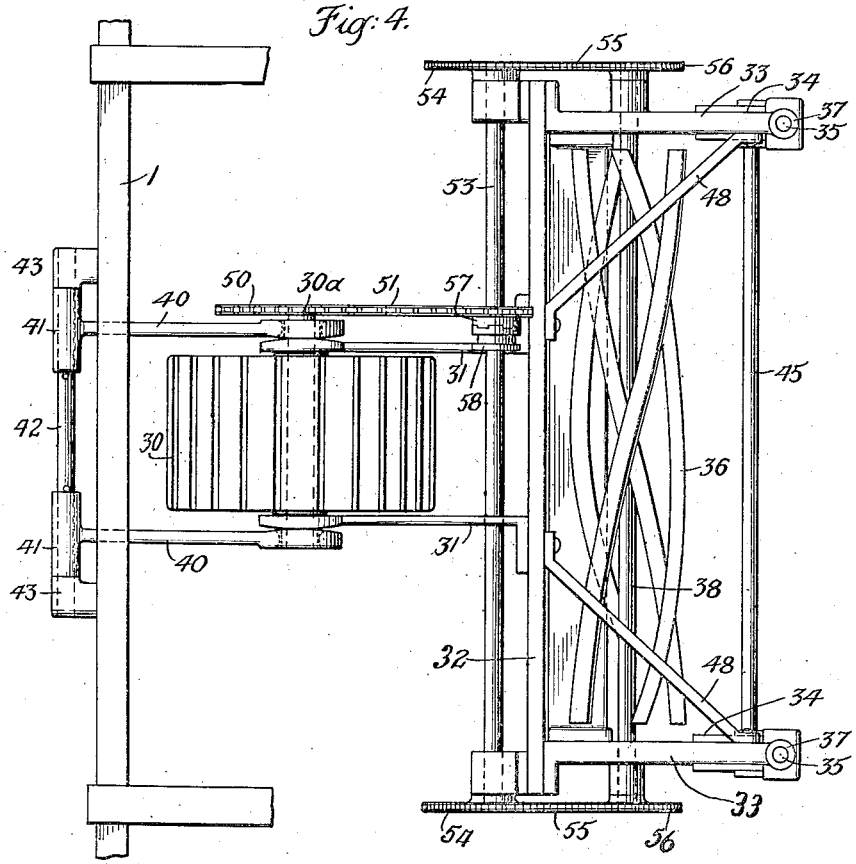
Fig. 4 is a top plan of a mower unit having the cutting mechanism arranged in front of the rotary traction wheel or roller thereof, and which is shown in the central position in the machine herein illustrated.
Figure 7:
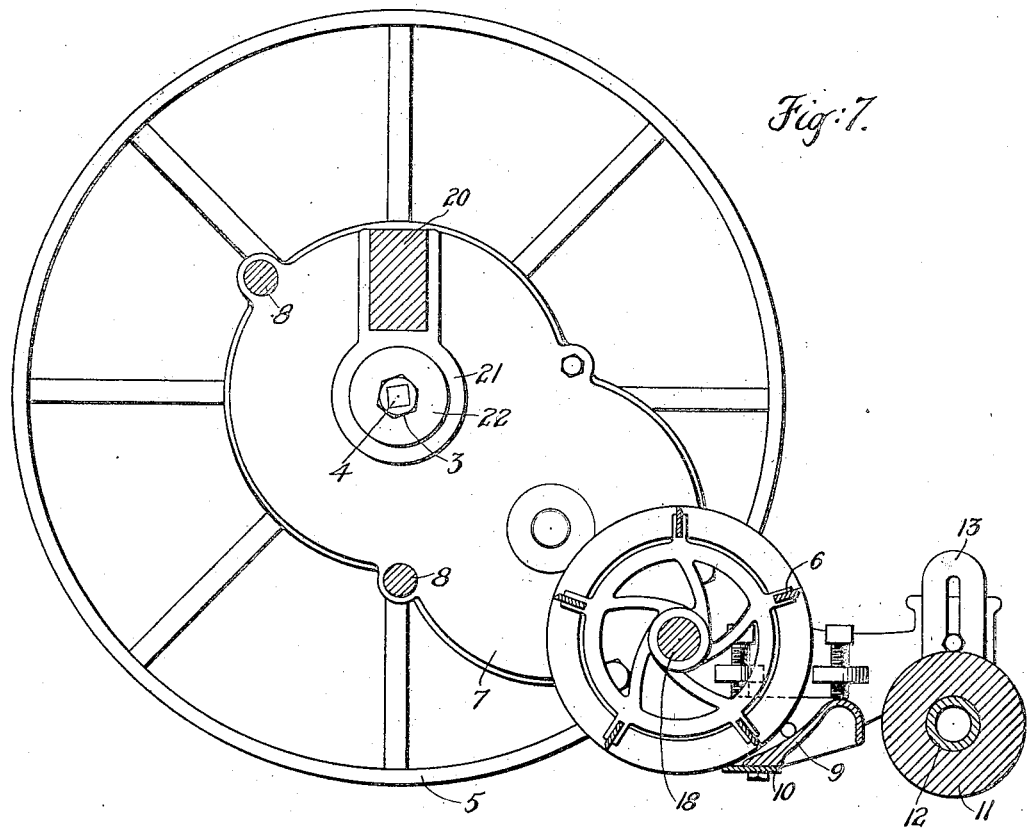
Fig. 7 is a vertical sectional view taken through one of the laterally arranged mower units in which the cutting mechanism is carried in rear of the rotary traction wheels.
Figure 8:
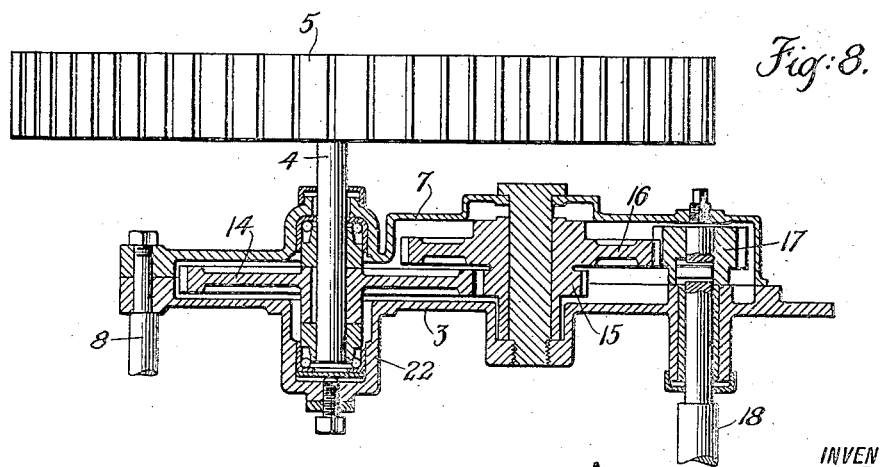
Fig. 8 is a detail sectional view showing one of the traction wheels and its supporting and driving connections.

Each of the lateral mower units is provided with a transversely disposed supporting member, 20, which is, in this instance, provided at each end with a bearing sleeve, 21, which pivotally engages a hub, 22, on the inner face of one of the side frames, see Fig. 7, and I provide means for pivotally connecting the said supporting member or bar, 20, to the draft frame of the machine. In this instance, I have shown each supporting member, 20, provided with a saddle, 23, having a sleeve portion, 24, for engaging pivotally the bar, 2, of the frame which is conveniently in the form of a pipe or tube, thus forming a pivotal connection between the frame and the lateral mower units, as clearly shown in Fig. 1. Between the inner traction wheels, 5, of the lateral units, I provide the rotary ground engaging traction device or devices for the third or centrally located mower unit which may be either a pair of traction wheels, or preferably, and as shown, a light traction roller, 30, which is preferably of smaller diameter than the traction wheels, 5, of the lateral mower units, but has its axis in the same vertical plane extending transversely of the machine as the axes of the wheels, 5, as clearly shown in Figs. 2 and 3, so that the ground engaging portions of all of the traction devices of all three units are in a line extending transversely of the machine.

This central traction roller does not support any portion of the draft frame of the machine, but merely supports the rear end of the frame of the centrally disposed mower unit which is constructed differently from the frames of the lateral units heretofore described. This centrally located mower unit is provided with forwardly extending side plates, 31, the rear ends of which are provided with bearings for the shaft of the traction roller, 30, and at their forward ends are connected to a transversely disposed plate, 32, to which are bolted or otherwise secured the side frames, 33, of the central mower unit, which extend forwardly from said plate and carry the rotary cutter, 36, mounted upon a shaft, 38. The forward ends of the side frames are provided with narrow caster wheels, 34, having vertically disposed spindles, 35, extending vertically through suitable bearings, 37, and the caster wheels are adjustable vertically with respect to the frames by means of collars, 39, secured to the spindles between the bearings, 37, by screws or otherwise, for the purpose of regulating the height of cut of the cutting mechanism of the centrally disposed mower unit.

Figure 5:
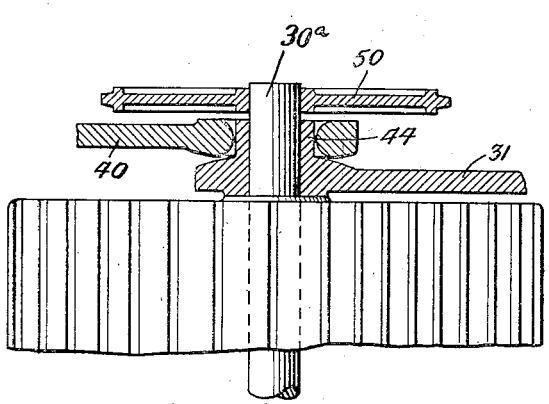
Fig. 5 is an enlarged sectional view showing a portion of the traction wheel or roller of the mower unit illustrated in Fig. 4, and the adjacent portions of the mower frame and of one of the push arms for propelling the said mower unit over the ground.

In order to propel the centrally disposed mower unit I provide push arms connecting it with the draft frame of the machine in such a manner as to allow the cutting mechanism of said unit to rock transversely and also to rise and fall with respect to the draft frame in order to conform to the surface of the ground traversed by it, independently of the frame and the lateral mower units. In the embodiment of my invention herein shown these push arms are indicated at 40, and are provided at their rear ends with sleeves, 41, pivotally mounted on a rod, 42, carried by brackets, 43, secured to the main frame, in this instance, to the rear bar, 1, thereof, and the forward ends of said push arms are loosely connected to the centrally located mower unit, and in this instance, pivotally engage hubs, 44, on the outer faces of the side plaes, 31. The inner faces of the push arms, and the outer faces of the side plates are preferably made convex as shown best in Fig. 5, and the apertures in the forward ends of the push arms are enlarged at the inner and outer ends thereof, as also shown in Fig. 5, so as to make the pivotal joints between the push arms and the centrally located mower unit sufficiently loose to permit of the transverse rocking of the said unit so that the caster wheels which are closely associated with the cutting mechanism of said unit may be at all times in contact with and follow the configuration of the ground traversed.

The side frames, 33, of the centrally located mower unit are connected by a suitable tie rod, 45, by the plate, 32, and by the stationary knife bar, 46, carrying the stationary knife, 47, and the said side frames, 33, may be further braced by the diagonal braces, 48, extending from the outer ends of the side frames to the transverse plate, 32, as shown, or otherwise, if desired. The rotary cutter, 36, can be driven in any desired manner from the traction roller, 30. In this instance, I have shown the shaft, 30$^a$, of the traction roller, 30, provided with a sprocket wheel, 50, connected by a chain, 51, with a sprocket wheel, 52, on a transverse shaft, 53, supported in bearings secured to the rear face of the plate, 32, and carrying at each end a sprocket wheel, 54, which is connected by a chain, 55, with a sprocket wheel, 56, on the shaft 38, of the rotary cutter, suitable provision being made to prevent the rotary cutter from being driven reversely as, for example, by providing the sprocket wheels, 56, with over-running clutches (not shown) in a well known way.

If it is desired to provide means for disconnecting the rotary cutter entirely from its driving mechanism such means may be provided, and I have shown, in this instance, the shaft, 53, provided with a clutch mechanism, one member, 57, of which is connected with the sprocket wheel, 52, which is mounted loosely on the shaft, 53, the other clutch member, 58, being keyed or otherwise secured to the shaft, 53, so as to be movable longitudinally thereon, while rotating therewith. A clutch lever, 60, is shown extending upwardly to a point adjacent to the driver's seat, and provided at its lower end with a yoke, 61, engaging a groove in the clutch member, 58, for shifting the latter into and out of operative position.

In this instance, the longitudinally disposed bars, 70—70, of the draft frame, each carry a bracket, 71, having a vertically disposed portion, 72, to which is secured a bracket, 73, having a vertically disposed portion, 74, and a horizontal portion, 75, to which the shafts (or tongue or other draft appliances) forming part of the draft frame are connected. One or both of the vertical portions, 72—74 of the said brackets is or are provided with a plurality of bolt holes and said parts are connected adjustably by bolts and nuts or otherwise so as to provide for the vertical adjustment of the shafts or tongue, 76, with respect to the frame of the machine. 80 represents the driver's seat carried by a support, 81, secured to a bracket, 82, the said bracket being adjustable in a direction longitudinally of the machine. In this instance, I have shown the main frame provided with a flooring, 83, between the longitudinal bars, 70, having therein a slot, 84, to receive bolts, 85, which secure the seat holding bracket, 82, in position and permit its adjustment forwardly or rearwardly, and the foot support, 95, is also adjustable longitudinally with or independently of the seat by means of bolts, 97, and slots, 70$^a$, hereinbefore described. I prefer to locate the driver's seat forward of the transverse line of contact of the frame supporting wheels, 5—5, with the ground, so that a considerable portion of the weight of the driver as well as the frame itself is transferred to the shafts or tongue, 76, and thereby to the horse or horses or tractor so as to relieve the traction wheels of the laterally disposed mower units of a considerable portion of the weight of the superposed frame, and the weight carried thereby. If it is desired to relieve the traction wheels still further of weight, as in passing over wet or soft ground, the driver's seat and foot board can be adjusted farther forward, and if it is desired to add to the weight on the traction wheels, 5, to increase their traction, the driver's seat and foot board may be correspondingly adjusted toward the rear, but in any case a considerable portion of the weight of the draft frame and the load carried thereby will be borne by the horse or horses, or tractor, thus preventing undue marking of the lawn by the traction wheels of the laterally located units.

It will also be seen that as the machine is drawn forward the rotary cutter, 36, of the centrally located mower unit, will cut the grass in advance of and will overlap the cutters, 6, of the laterally disposed mower units and the inner traction wheels thereof, while the traction roller for the advanced cutting mechanism is in rear of the cutter and traverses the stubble after the grass has been cut. The only rotary devices which engage any of the long grass in advance of any cutter are the narrow caster wheels of the central mower unit, which are not traction wheels, and do not carry any part of the weight of the draft frame. Said caster wheels are narrow and bear very lightly on the grass, so that the grass quickly springs up in rear thereof before being reached by the cutters, 6, of the laterally disposed mower units, thus enabling the machine to cut all the grass throughout its entire swath uniformly, and avoiding the unsightly tufted ridges frequently if not invariably left where the long grass is traversed by traction wheels carrying a considerable part of the weight of their own units or of a superposed frame.

It will also be seen that the machine herein shown and described can be turned at right angles upon a point located substantially centrally of the width of the machine, if desired, in which case one of the lateral mower units would be drawn forward, and the other one pushed rearward, the centrally disposed mower unit swinging laterally and the front end being carried by the caster wheels which during such turning movement would trail in the usual and well known manner. In order to relieve the push arms from undue strain, I prefer to provide the forwardly extending bars, 70, of the frame with downwardly extending guide bars, 90, which are rigidly secured to the bars, 70, and are located adjacent to the outer faces of the side frames, 33, of the centrally disposed mower unit. These guide bars, 90, merely act to engage the side frames at one side or the other when the machine is turned to the right or left as the case may be and assist in moving the front portion of the centrally disposed mower unit laterally upon its caster wheels thereby relieving the push arms and the shaft of the traction roller, 30, from unnecessary strain, although the machine will operate without these guiding arms.

I prefer to so arrange the pivotal connections at the front and rear ends of the push arms, 40, that said arms will incline downwardly and forwardly so that they will tend to exert a slight downward pressure on the traction roller, 30, and increase the normal traction thereof due to its weight whereby a lighter roller may be employed than would otherwise be required. Where a horse or horses are employed to draw the machine the draft frame is provided with suitable means for attaching the draft animal, a whiffletree, 91, being shown in connection with the shafts, 76, for this purpose.

Figure 9:
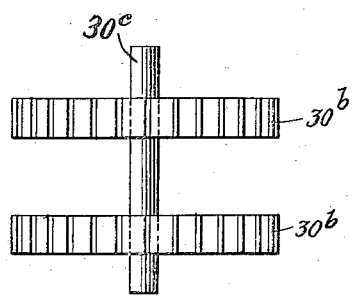
Fig. 9 is a detail view showing a pair of traction wheels which may be substituted for the driving roller of the centrally disposed mower unit shown in the other figures.

In place of the driving roller, 30, I may use a pair of driving wheels, 30^b—30^b, as shown in Fig. 9, rigidly secured to the shaft, as the rotary traction devices for the centrally located mower unit. While I have shown in the accompanying drawing a machine embodying my invention provided with three mower units, it is obvious that the invention is not limited to this exact number. For example, I may extend the transverse portion of the draft frame laterally beyond the laterally disposed supporting units, and provide at each end thereof a forwardly projecting mower unit, like the centrally located mower unit herein shown and described, thus increasing the number of units to 5, for example, in which case the advantages of my invention would also be secured, all the traction wheels being located in a vertical plane extending transversely of the machine, and the construction being such that no traction wheel would press down the long grass in advance of any cutting mechanism of another unit, while the forwardly extending units, which do not support any part of the weight of the frame, would each be free to rock transversely and rise and fall independently of the frame to accommodate variations in the surface traversed.

In a machine constructed according to my invention, not only is it capable of being turned with the greatest facility and of being moved backwardly as well as forwardly, but where it is drawn by draft animals the load is coupled closely in rear of the horse or horses or tractor, giving the most advantageous arrangement for hauling the same. It is to be understood, however, that the machine is capable of being either pulled or pushed by the draft appliances of the frame and that the machine can be propelled in either manner by horses or by a tractor as may be found desirable or convenient.

What I claim and desire to secure by Letters Patent is:

1. In a gang lawn mower, the combination of a plurality of mower units, each comprising independently rotatable ground engaging traction devices and cutting mechanism operated thereby, the cutting mechanisms of all of said units being arranged to cut a wide swath continuous from one side of the mower to the other, the traction devices of all of said units having their axes substantially in a single vertical plane extending transversely of the mower, a frame and connections from said frame to each of said units for holding the axes of said traction devices of all of said units at all times in said vertical plane, said connections having means permitting the traction devices of each unit to rock transversely with respect to those of other units.

2. In a gang lawn mower the combination of a plurality of mower units, each including cutting mechanism and rotary ground engaging traction devices operatively connected with the cutting mechanism, the traction devices of all of said units having their axes substantially in a single vertical plane extending transversely of the machine, and a rigid draft frame connected with all of said units having portions extending longitudinally with respect to said plane and having a portion of its weight supported by certain of the traction devices of said units, the center of gravity of the frame and the load supported thereby being located on the side of said transverse plane toward said longitudinally extending portions of said frame.

3. In a gang lawn mower, the combination of a plurality of mower units each including cutting mechanism and rotary ground engaging traction devices operatively connected with the cutting mechanism, a draft frame, having portions supported by certain of said units less than the whole number, connections between said frame and said units for maintaining the axes of their traction devices substantially in a single vertical plane extending transversely of the machine, said frame having longitudinally disposed draft portions extending in a direction away from said vertical plane, and means for varying the amount of weight, of the frame and load carried by the traction wheels of the said certain units upon which portions of the frame rest, without increasing the actual weight of the frame and its load.

4. In a gang lawn mower the combination of a plurality of mower units each including cutting mechanism and rotary ground engaging traction devices operatively connected with the cutting mechanism, the rotary traction devices of all of said units having their axes substantially in a single vertical plane extending transversely of the machine, the cutting mechanism of at least one of said units being disposed forwardly of said plane and forwardly of the cutting mechanisms of other units arranged laterally with respect thereto, and means for simultaneously propelling the said units forwardly and maintaining the axes of said traction devices substantially in said vertical transverse plane.

5. In a gang lawn mower the combination of a plurality of mower units each including cutting traction devices operatively connected with the cutting mechanism, the rotary traction devices of all of said units having their axes substantially in a single vertical plane extending transversely of the machine, the cutting mechanism of at least one of said units being disposed forwardly of said plane and forwardly of the cutting mechanisms of other units arranged laterally with respect thereto, and a draft frame uniting said units and provided with means for holding the axes of the traction devices of all the units at all times substantially in said vertical transverse plane.

6. In a gang lawn mower the combination of a plurality of mower units each including cutting mechanism and rotary ground engaging traction devices operatively connected with the cutting mechanism, the rotary traction devices of all of said units having their axes substantially in a single vertical plane extending transversely of the machine, the cutting mechanism of at least one of said units being disposed forwardly of said plane and forwardly of the cutting mechanism of others of said units arranged laterally with respect thereto, and a draft frame connected to and having a portion only of its weight supported by said laterally arranged units, and connections between the said frame and the forwardly disposed unit for propelling the same by the forward movement of the frame, said connections including means for enabling the said forwardly disposed unit to rise and fall with respect to said frame.

7. In a gang lawn mower the combination of a plurality of mower units each including cutting mechanism and rotary ground engaging traction devices operatively connected with the cutting mechanism, the rotary traction devices of all of said units having their axes substantially in a single vertical plane extending transversely of the machine, the cutting mechanism of at least one of said units being disposed forwardly of said plane and forwardly of the cutting mechanism of others of said units arranged laterally with respect thereto, and a draft frame connected to and having a portion of its weight supported by said laterally arranged units, and connections between the said frame and the forwardly disposed unit for propelling the same by the forward movement of the frame, said connections including means for enabling the forwardly disposed unit to rise and fall with respect to said frame, and to rock transversely with respect to said frame.

8. In a gang lawn mower the combination of a plurality of mower units each including rotary ground engaging traction means and cutting mechanism operatively connected therewith, the traction means of all of said units having their axes substantially in a single vertical plane extending transversely of the machine, the cutting mechanism of at least one of said units being located forward of said plane and having portions extending laterally beyond the traction means thereof and in front of a traction means forming part of another mower unit arranged laterally with respect thereto, and means for propelling said units simultaneously over the ground forwardly and maintaining the axes of said traction means substantially in said vertical transverse plane.

9. In a gang lawn mower the combination of a plurality of mower units each including rotary ground engaging traction means and cutting mechanism operatively connected therewith, the traction means of all of said units having their axes substantially in a single vertical plane extending transversely of the machine, the cutting mechanism of at least one of said units being located forward of said plane and having portions extending laterally beyond the traction means thereof and in front of a traction means forming part of another mower unit located laterally with respect thereto, and a draft frame, connections from all of said units to said frame, said connections including means for enabling each unit to rock transversely with respect to said frame to accommodate inequalities of the ground.

10. A gang lawn mower comprising a pair of laterally located mower units, and a centrally located mower unit, each of said units including rotary ground engaging traction means and cutting mechanism operated thereby, the traction means of all of said units having their axes located substantially in a single vertical plane extending transversely of the machine, the cutting mechanism of said centrally located unit being located forward of said plane and having portions extending in front of the traction means and the cutting mechanism forming part of each of said laterally located units, and means for simultaneously propelling all of said units.

11. A gang lawn mower comprising a pair of laterally located mower units, and a centrally located mower unit, each of said units including rotary ground engaging traction means and cutting mechanism operated thereby, the traction means of all of said units having their axes located substantially in a single vertical plane extending transversely of the machine, the cutting mechanism of said centrally located unit being located forward of said plane and having portions extending in front of traction means and cutting mechanism forming part of each of said laterally located units, and a draft frame connected with each of said units and having a portion only of its weight supported by the lateral units only, the connections between said frame and the centrally located unit including means for enabling the latter to rise and fall independently of the frame.

12. A gang lawn mower comprising a pair of laterally located mower units, and a centrally located mower unit, each of said units including rotary ground engaging traction means and cutting mechanism operated thereby, the traction means of all of said units having their axes substantially in a single vertical plane extending transversely of the machine, the cutting mechanism of said centrally located unit being located forward of said plane and having portions extending in front of traction means forming part of the traction means of each of said laterally located units, a draft frame connected to and having a portion of its weight supported by said laterally located units, and connections between said frame and said centrally located unit including means for enabling the latter to rock transversely with respect to the draft frame and to rise and fall with respect thereto.

13. A gang lawn mower comprising a pair of laterally located mower units and a centrally located mower unit, each of said units including rotary ground engaging traction means and cutting mechanism operated thereby, the traction means of all of said units having their axes located substantially in a single vertical plane extending transversely of the machine, the cutting mechanism of said centrally located unit being located forward of said plane and having portions extending in front of traction means forming part of the traction means of each of said laterally located units, a draft frame connected to and having a portion of its weight supported by said laterally located units, push arms pivotally connected to said frame and having loose pivotal connection with said centrally located unit to enable the same to rise and fall independently of the frame and to rock transversely with respect thereto.

14. A gang lawn mower comprising a pair of laterally located mower units and a centrally located mower unit, each of said units including rotary ground engaging traction means and cutting mechanism operated thereby, the traction means of all of said units having their axes substantially in a single vertical plane extending transversely of the machine, the cutting mechanism of said centrally located unit being located forward of said plane and having portions extending in front of traction means forming part of the traction means of each of said laterally located units, a draft frame connected to and having a portion of its weight supported by said laterally located units, connections between said frame and said centrally located unit including means for enabling the latter to rise and fall with respect to the frame and to rock transversely with respect thereto, and guiding devices connected to the draft frame for engaging said centrally located unit in advance of its connections with the draft frame to relieve said connections from undue strain in turning the machine.

15. A gang lawn mower comprising a pair of laterally located mower units and a centrally located mower unit, each of said units including rotary ground engaging traction means and cutting mechanism operated thereby, the traction means of all of said units having their axes substantially in a single vertical plane extending transversely of the machine, the cutting mechanism of said centrally located unit being located forward of said plane and having portions extending in front of traction means forming part of the traction means of each of said laterally located units, a draft frame connected to and having a portion of its weight supported by said laterally located units, push arms pivotally connected to said draft frame having loose pivotal connections with said centrally located unit, said centrally located unit having caster wheels located in advance of its traction means, and guiding devices connected with said draft frame, and located forward of the traction means for engaging said centrally located unit to relieve the push arms from undue strain in turning the machine.

16. A gang lawn mower comprising a pair of laterally located mower units and a centrally located mower unit, each of said units including rotary ground engaging traction means and cutting mechanism operated thereby, the traction means of all of said units having their axes substantially in a single vertical plane extending transversely of the machine, and the cutting mechanism of the said centrally located unit being located forward of said plane and having portions extending in front of traction means forming part of the traction means of each of said laterally located units, a draft frame connected to and having a portion of its weight supported by said laterally located units, connections from said frame to said centrally located unit including means for enabling the latter to rise and fall and rock transversely with respect to the draft frame, the center of gravity of said frame and its load being located forward of the axes of said traction means.

17. A gang lawn mower comprising a pair of laterally located mower units and a centrally located mower unit, each of said units including rotary ground engaging traction means and cutting mechanism operated thereby, the traction means of all of said units having their axes located substantially in a single vertical plane extending transversely of the machine, the cutting mechanism of said centrally located unit being located forward of said plane and having portions extending in front of traction means forming part of the traction means of each of said laterally located units, a draft frame connected to and having a portion of its weight supported by said laterally located units, connections from said frame to said centrally located unit including means for enabling the latter to rise and fall and rock transversely with respect to the frame, the center of gravity of said draft frame and its load being located forward of the axes of said traction means, a driver's seat supported on said draft frame, and means for adjusting the driver's seat longitudinally of the machine to vary the proportion of the weight of the frame and its load carried by the traction means of said laterally located units.

18. A gang lawn mower having a plurality of mower units, each comprising rotary traction devices and cutting mechanism driven therefrom, the cutting mechanisms of said units being arranged to overlap each other, and the traction devices of all of said units being arranged in a single line extending transversely of the path of the machine and means for propelling all of said mower units simultaneously and holding their traction devices substantially in said transverse line and against lateral movement with respect to each other.

19. A gang lawn mower having a plurality of mower units each comprising rotary traction devices and cutting mechanism driven therefrom, the cutting mechanisms of said units being arranged to overlap each other, and the traction devices of all of said units being arranged in a single line extending transversely of the path of the machine, and means connected with all of said units for holding the traction devices of all of said units in alined position and preventing them from turning laterally with respect to said means or each other.

In testimony whereof I affix my signature.

WILLIAM HERBERT COLDWELL.

Witnesses:
C. C. BOURNE,
E. C. ROSS.